(12) United States Patent
Meredith et al.

(10) Patent No.: US 6,502,154 B1
(45) Date of Patent: Dec. 31, 2002

(54) BUS BRIDGING METHOD AND APPARATUS INCLUDING USE OF READ SIZE INDICATORS

(75) Inventors: Susan S. Meredith, Hillsboro, OR (US); Warren R. Morrow, Stellacoom, WA (US); Wendell S. Wenjen, San Jose, CA (US); John Baudrexl, Olympia, WA (US); David L. Chalupsky, Banks, OR (US); Dave B. Minturn, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/449,502

(22) Filed: Nov. 24, 1999

(51) Int. Cl.[7] .............................................. G06F 13/00
(52) U.S. Cl. ...................................... 710/305; 370/402
(58) Field of Search ................................ 710/305, 306, 710/310, 313, 52, 312; 370/402; 711/100, 146, 163

(56) References Cited

U.S. PATENT DOCUMENTS

| 5,696,768 | A | * | 12/1997 | Harriman et al. |
| 5,915,104 | A | * | 6/1999 | Miller |
| 6,279,087 | B1 | * | 8/2001 | Melo et al. |
| 6,330,630 | B1 | * | 12/2001 | Bell |

* cited by examiner

*Primary Examiner*—Gopal C. Ray
(74) *Attorney, Agent, or Firm*—Blakely, Sokoloff, Taylor & Zafman LLP

(57) ABSTRACT

A bus bridging method, a bus bridge and a bus agent are described. In a bus agent provides to a bus bridge a read data request targeting a data source bridged by the bus bridge. The read data request includes a read address indicating a starting storage location of the requested data, and a read size indicator indicating the size of the requested data. The bus bridge, in response, facilitates provision of the requested data to the bus agent. The facilitation includes streaming buffered ones of the requested data to the bus agent through one or more successive streaming connections to the bus bridge by the bus agent.

23 Claims, 7 Drawing Sheets

BUS BRIDGING METHOD AND APPARATUS INCLUDING USE OF READ SIZE INDICATORS

BACKGROUND OF THE INVENTION

1. Field of the Invention

The present invention relates to the field of computer or digital systems. More specifically, the present invention relates to bus bridging on computer/digital systems.

2. Background Information

To support the high-bandwidth data transfers demanded by modern applications, data are clocked across the buses of today's computer/digital systems at tremendous rates. To achieve, reliable, high speed data transfer, such system often includes a number of buses arranged in a hierarchy and interconnected by devices call bus bridges.

A bus bridge is basically a load isolating device that allows multiple devices to appear as a single capacitive load to a bus. Although the reduced capacitive loading increases the maximum frequency at which a bus can be operated, the bridge adds a layer of complexity to the design and operation of the computer/digital system. One reason is because requests to transfer data from a requester side of a bridge to a target side of the bridge must often be buffered in the bridge. This is often caused by the bridge having to arbitrate with other devices to gain control of the target-side bus. As arbitration time may vary, it is usually desirable to buffer the requested data transfer, and then cause the device which requested the data transfer to relinquish the requester-side bus. Thus, other transfers may take place on the requester-side bus, while the bus bridge is performing the requested data transfer. If a read operation has been requested, the returned data also must typically be buffered, while the bridge notifies the requester that the data is available (or while the bridge waits for the requester to ask if the data is available) and while the requester arbitrates to re-gain control of the requester-side bus.

It will be appreciated that the above-described buffering of requests and data imposes a latency penalty on any data transfer which must cross the bus bridge. Moreover, because the latency penalty is incurred with each transfer across the bridge, the smaller the quantum of data per bridged transfer, the lower the effective bandwidth of the data transfer.

One technique used to avoid loss of bandwidth due to bus bridging is to speculatively pre-fetch additional data in response to each data transfer request. Assuming that the speculatively pre-fetched data is actually used by the requesting device, pre-fetching effectively increases the quantum of data per bridged transfer and therefore increases the effective bandwidth of data transfer across the bridge. However, if the speculatively pre-fetched data are not used, the discarded pre-fetches waste the bandwidth on the target-side bus consumed for the pre-fetching.

One other problem that may also arise when data is pre-fetched, is that even though the requesting device may need the pre-fetched data, its internal data buffer may be too shallow to read all of the pre-fetched data in the bridge in a single read transaction. Consequently, after retrieving a portion of the pre-fetched data, the requesting device relinquishes control of the requester-side bus (also referred to as logically disconnecting from the bus bridge) while it performs the internal operation of transferring the data from its internal data buffer to its other internal resources. Because of the requesting device relinquishing control of the bus, prior art bridges typically assume that the requesting device has completed its transfer and reallocates the pre-fetch buffer for other data transfer operation. As a result, the pre-fetched data remaining in the pre-fetch buffer is lost, and the bandwidth consumed for the pre-fetch is wasted. Consequently, when the requesting device re-gains control of the requester-side bus and attempts to read data beginning where it left off, the read transaction must now cross the bridge and be handled by target-side devices again. Thus, in cases where the data buffer of the requesting device is substantially shallower than the pre-fetch buffer in the bridge, the bandwidth gains achieved by data pre-fetching can be significantly eroded.

Loss of pre-fetched data may be addressed by the support of split transactions. In a split transaction bus, each transfer request is typically accompanied by an identifier that identifies the requesting device. The identifier allows pre-fetched data to be matched with a requesting device even if the requesting device disconnects and then reconnects. Data is "re-streamed" upon reconnection by the requesting device. However, the identifier scheme significantly increases complexity to the design and operation of the system. An alternative solution is to provide a cache memory in the bridge. Experience has shown that too can be an expensive proposition.

In U.S. patent application Ser. No. 09/012,775, issued Jan. 2, 2001 as U.S. Pat. No. 6,170,030 entitled "Method and Apparatus for Restreaming Data That Has Been Queued In A Bus Bridge Device", filed on Jan. 23, 1998, an improved method for addressing the problem through a set of queue management rules was disclosed. In U.S. patent application Ser. No. 09/266,744, entitled "Computer System Having Improved Data Transfer Across A Bus Bridge", filed on Mar. 12, 1999, another method through "decomposed" fetches was disclosed. Both applications have common assignee as the present application. Each approach has its pros and cons. The present invention provides another approach to address the problem, offering certain advantages otherwise not available in the other approaches.

SUMMARY OF THE INVENTION

A bus agent provides to a bus bridge a read data request targeting a data source bridged by the bus bridge. The read data request includes a read address indicating a starting storage location of the requested data, and a read size indicator indicating the size of the requested data. The bus bridge, in response, facilitates provision of the requested data to the bus agent. The facilitation includes streaming buffered ones of the requested data to the bus agent through one or more successive streaming connections to the bus bridge by the bus agent. The bus bridge factors into consideration, the included read size indicator, in managing re-streaming eligibility of remaining buffered ones of the requested data.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described, and various details will be set forth in order to provide a thorough understanding of the present invention. However, it will be apparent to those skilled in the art that the present invention may be practiced with only some or all aspects of the present invention, and the present invention may be practiced without the specific details. In other instances, well known features are omitted or simplified in order not to obscure the present invention.

The description will be presented using terminology commonly employed by those skilled in the art to convey the substance of their work to others skilled in the art. Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 1:
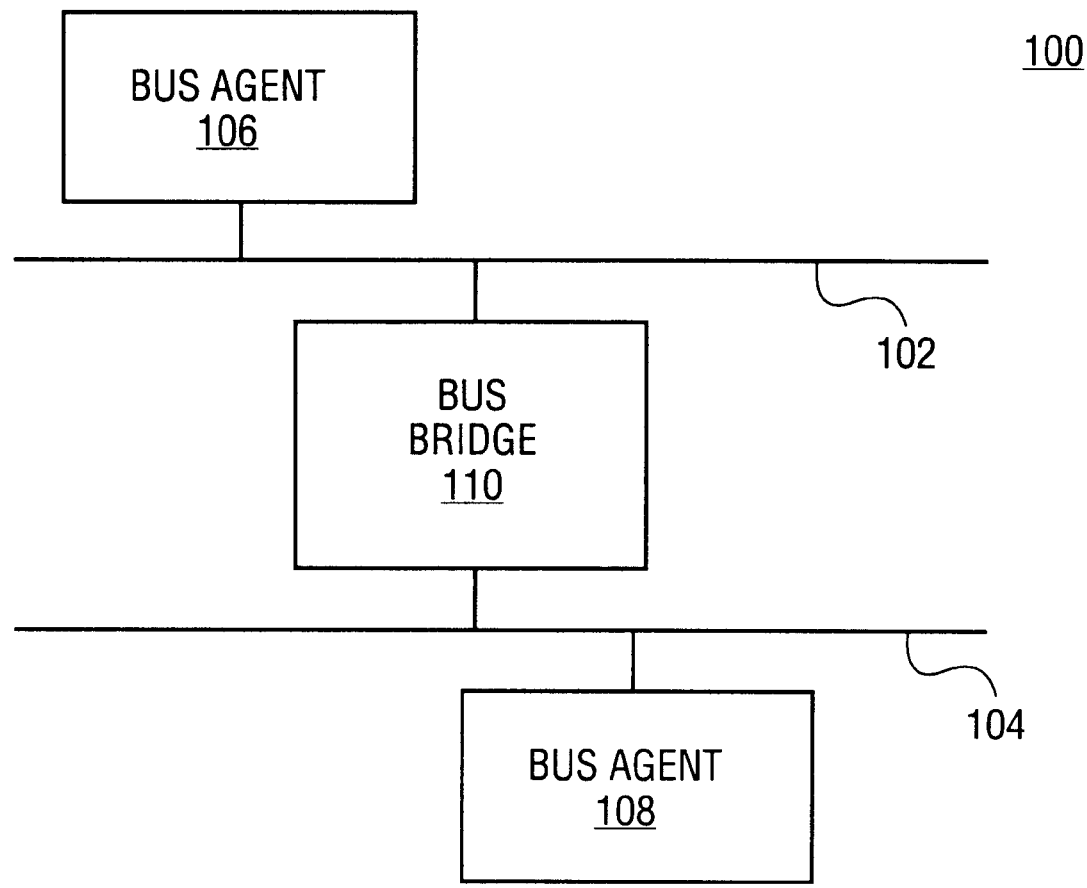
FIG. 1 is a block diagram illustrating an overview of a multi-bus subsystem incorporated with the teachings of the present invention in accordance with one embodiment.

Referring now to FIG. 1, wherein an overview of a multi-bus subsystem incorporated with the bus bridging teachings of the present invention is shown. As illustrated, multi-bus subsystem 100 includes buses 102 and 104, agents 106 and 108 attached to buses 102 and 104 respectively, and bus bridge 110 bridging buses 102 and 104. Agents 106 and 108 interact with each other through bus transactions with bus bridge 110 conducted on buses 102 and 104 respectively. For the illustrated embodiment, agent 106 is of a type equipped to accept and store data, as well as outputting stored data responsive to retrieval requests. Accordingly, it may serve as a data source as well as a data sink to agent 108. Agent 108 would store and retrieve data to and from agent 106 through write and read transactions with bus bridge 110 conducted on bus 104. Bus bridge 110 in turn will take care of the complementary transactions with agent 106 via bus 102. Furthermore, the read transaction between agent 108 and bus bridge 110 is of a type that permits agent 108 to accept the data returned for a read request over a number of successive streaming connections. That is, agent 108 logically connects itself to bus bridge 110 to submit a read request, and upon submission of the read request, logically disconnects itself from bus bridge 110. Thereafter, agent 108 logically reconnects itself to bus bridge 110 to accept the data being returned. Upon reconnection, bus bridge 110 streams buffered ones of the requested data for agent 108. For whatever operational reasons, e.g. buffer full and so forth, agent 108 may logically disconnect itself from bus bridge 100 again, in the middle of receiving the data being returned, and logically reconnects itself later to complete receiving the remaining data being returned. Agent 108 may accept the data being returned in this manner through any number of logical connects and disconnects. As will be described in more detail below, in accordance with the present invention, agent 108 is enhanced to include with a particular type of read request, a read size indicator indicating the exact size of the requested data desired, and bus bridge 110 is complementarily enhanced to manage data re-streaming eligibility based at least in part on the included read size indicator. As a result, the latency from request to receipt of the requested data for agent 108, as well as the likelihood of wasting the data bandwidth of bus 102 on unnecessary pre-fetches/re-fetches are reduced.

Except for the enhancement provided to agent 108 and bus bridge 110, buses 102 and 104, agents 106 and 108 and bus bridge 110 are otherwise intended to represent a broad range of these elements known in the art. In one embodiment, buses 102 and 104 are Peripheral Component Interconnect (PCI) buses, as defined by PCI Local Bus Specification, Rev. 2.1, Jun. 1, 1995, available from PCI Special Interest Group, Portland, Oreg., whereas bus bridge 110 is fundamentally a corresponding bridging device equipped to bridge two PCI buses. For this embodiment, agents 106 and 108 are devices fundamentally equipped to be able to connect themselves to a PCI bus, and conduct bus transactions as defined by the PCI specification. Examples of agents 106 and 108 include but not limited to memory subsystems, disk controllers, video controllers, and the like.

Before further describing the present invention, it should be noted that while for ease of understanding, only bus agents 106 and 108 are shown in FIG. 1, nevertheless, those skilled in the art will appreciate that the present invention may be practiced with more than just two bus agents correspondingly attached to the two buses. The present invention may be practiced with any number of bus agents attached to buses 102 and 104, subject only to the physical limitations of these buses. Furthermore, bus agents 106 and 108 are physically connected to bus bridge 110 through buses 102 and 104, thus all subsequent descriptions associated with bus agent 108 logically connecting and disconnecting from bus bridge 110 will simply be referred to as connecting and disconnecting. The logical nature of the connection and disconnection is inferred.

Figure 2A:
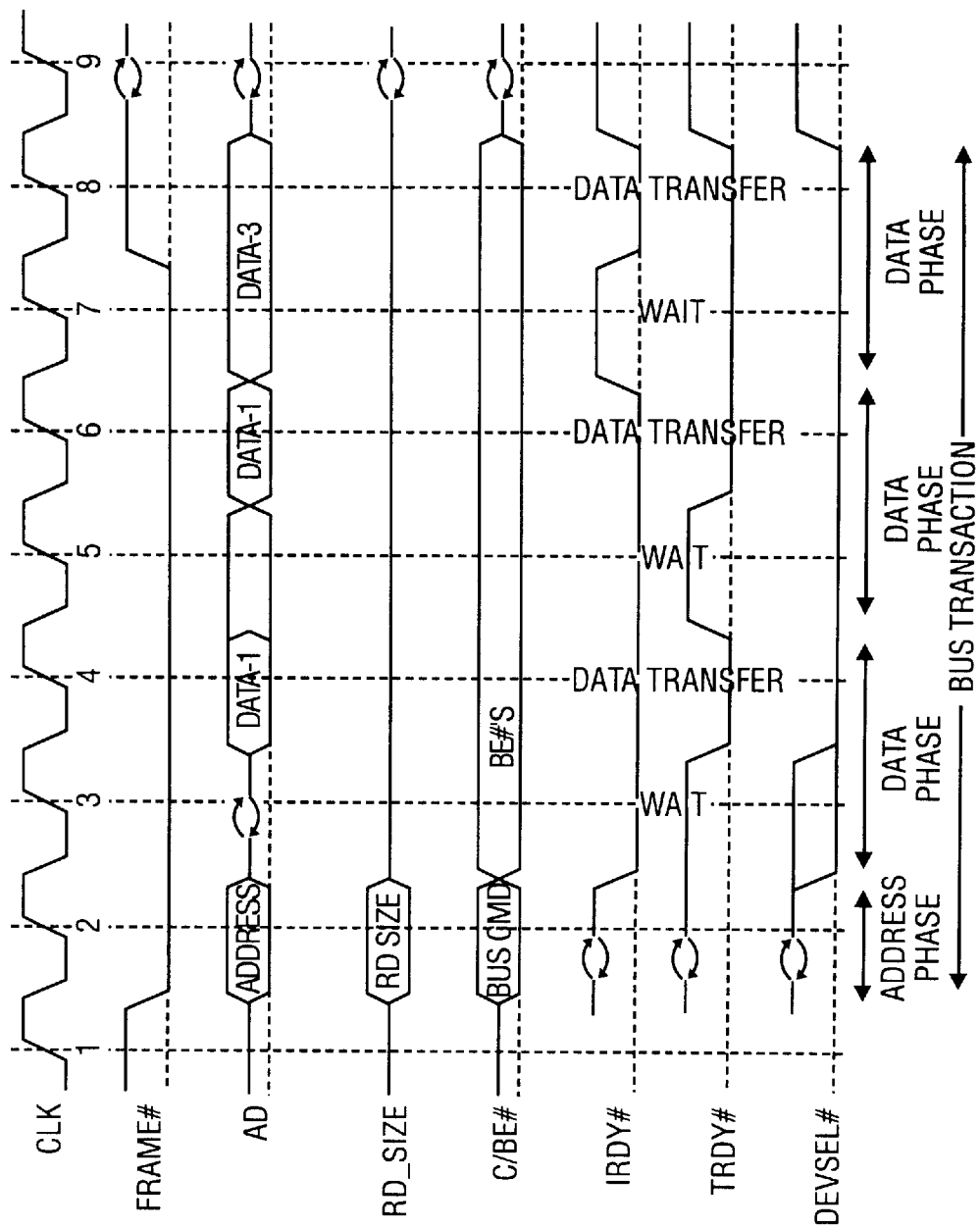
FIGS. 2a–2b are two timing diagrams illustrating a read transaction between the bus bridge and the data requesting bus agent of FIG. 1 in accordance with two embodiments, with each read transaction including the additional provision of a read size indicator.
Figure 2B:
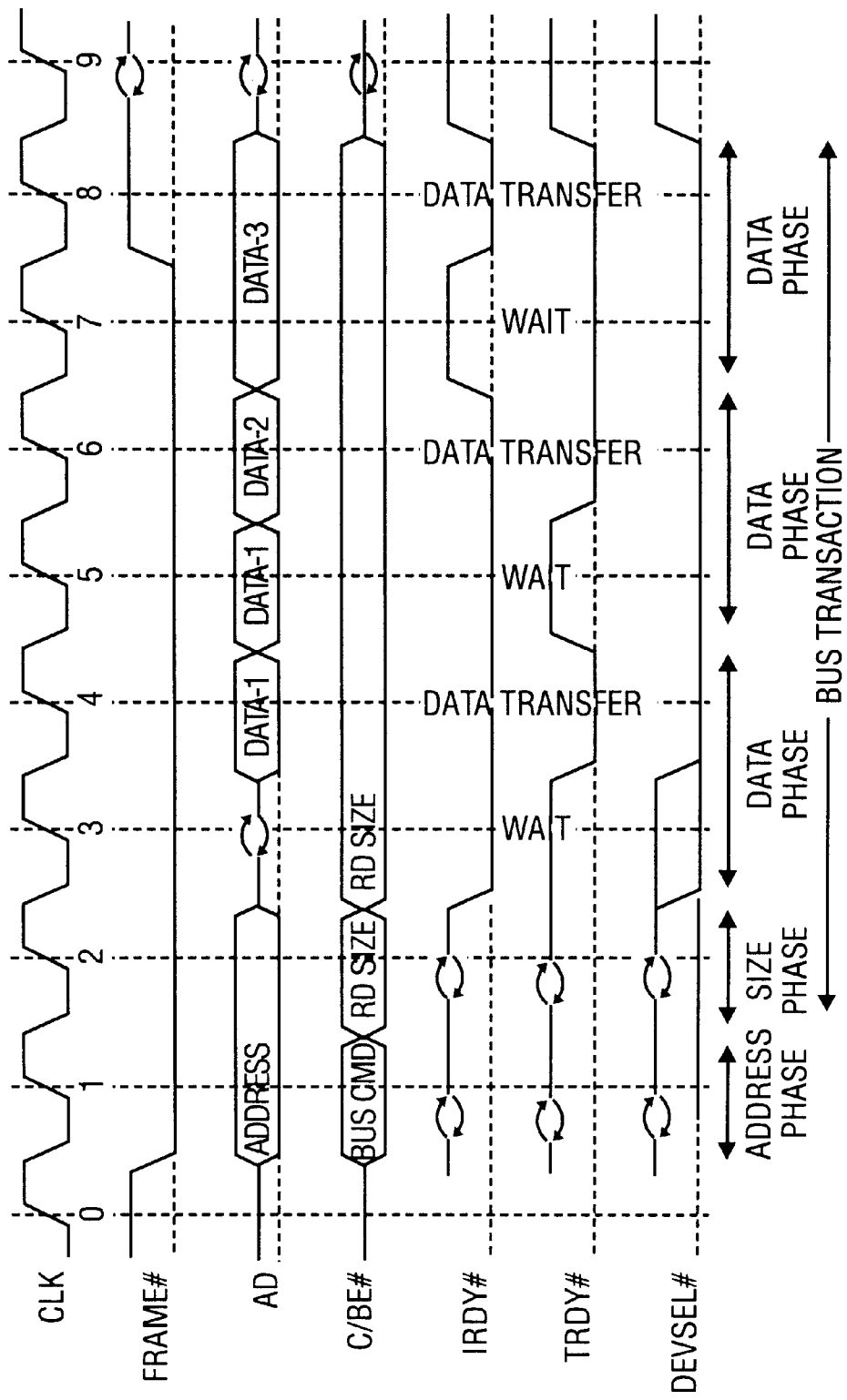

Referring now to FIGS. 2a–2b, wherein two timing diagrams illustrating a read transaction between bus agent 108 to bus bridge 110, including the manner the read size indicator is provided, in accordance with two embodiments, are shown. In each of these embodiments, a number of control signals, such as FRAME#, AD, C/BE# and so forth, are asserted and de-asserted at various points in time in accordance with a predetermined protocol to conduct the read transaction. In the context of a read transaction, AD typically specifies the starting storage location of the requested data (within agent 106), whereas the bus command denotes the fact that the transaction is a read transaction. In one embodiment, the read command further denotes the type of read transaction. For the illustrated embodiment, the read command may denote one of three types of read transactions, Memory Read, Memory Read Line and Memory Read Multiple. Moreover, for the Memory Read Multiple command, bus agent 108 may optionally further qualify the read command with a read size indicator of the present invention. According to one embodiment, when a Memory Read, a Memory Read Line or a Memory Read Multiple without the read size indicator qualification is specified, bus bridge 110 pre-fetches data as specified in the aforementioned PCI specification, and handles re-streaming eligibility as in the prior art (e.g. invalidating any remaining pre-fetched data). If a Memory Read Multiple qualified by a read size indicator is specified, bus bridge 110 pre-fetches the requested data and handles re-streaming eligibility in accordance with the present invention, to be described more fully below. In alternate embodiments, a new command may be added instead (as opposed to modifying the Memory Read Line command). In other embodiment, the read size indicator qualification may be extended to Memory Read and Memory Read Line as well. Thus, those skilled in the art will appreciate that both embodiments are basically enhanced derivatives of the prior art PCI read transaction. That is, except for the novel introduction of the read size indicator signal, the rest of the illustrated control signals, i.e. FRAME#, AD, C/BE# and so forth, are the corresponding well known PCI signals. Accordingly, except for the provision of the read size indicator, these other control signals will not be otherwise further described.

The embodiment of FIG. 2a illustrates an approach where the read size indicator is provided by bus agent 108 in parallel with the address (AD) and bus command (C/BE#) associated with the read request. For the illustrated embodiment of FIG. 2a, additional signal lines and pins are correspondingly provided to buses 104 and bus bridge/agent 110/108 to facilitate the illustrated parallel provision of the read size indicator, when it is provided. On the other hand, the embodiment of FIG. 2b illustrates an approach where the read size indicator, when provided, is provided by bus agent 108 after provision of the bus command (C/BE#), using the same signal lines. Under this embodiment, a new phase, in addition to the conventional address and data phases is added to facilitate the provision of the read size indicator.

Figure 3:
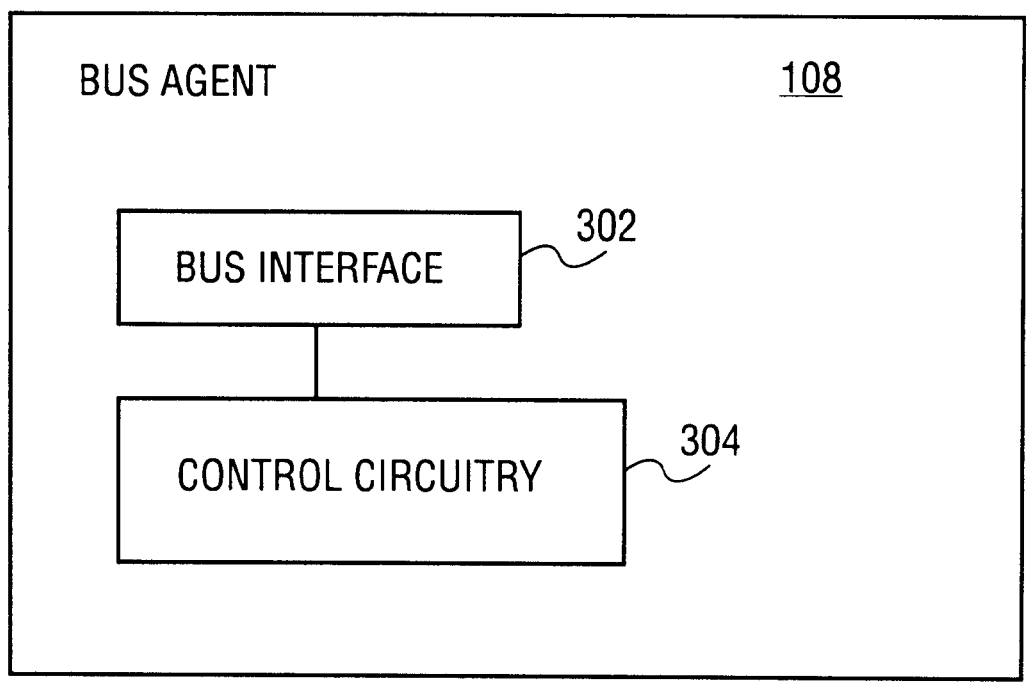
FIG. 3 illustrates the data requesting bus agent of FIG. 1 in further detail in accordance with one embodiment.

FIG. 3 illustrates the relevant parts of bus agent 108 in accordance with one embodiment. As illustrated, bus agent 108 includes interface 302 and control circuitry 304 coupled to each other as shown. Interface 302 couples bus agent 108 to bus 104, and drives as well as latches various control and data signals onto and off bus 104 under the control of control circuitry 304. Control circuitry 304 controls interface 302 to drive and latch various control and data signals in accordance with a bus transaction protocol (e.g. PCI's bus transaction protocol). In particular, control circuitry 304 controls interface 302 to drive the earlier described read size indicator as an integral part of a read transaction, in accordance with the present invention. Except for this additional control and use of interface 302 and control circuitry 304, these elements are otherwise intended to represent a broad range of bus agent interface and control circuitry known in the art, accordingly, will not be further described.

Figure 4:
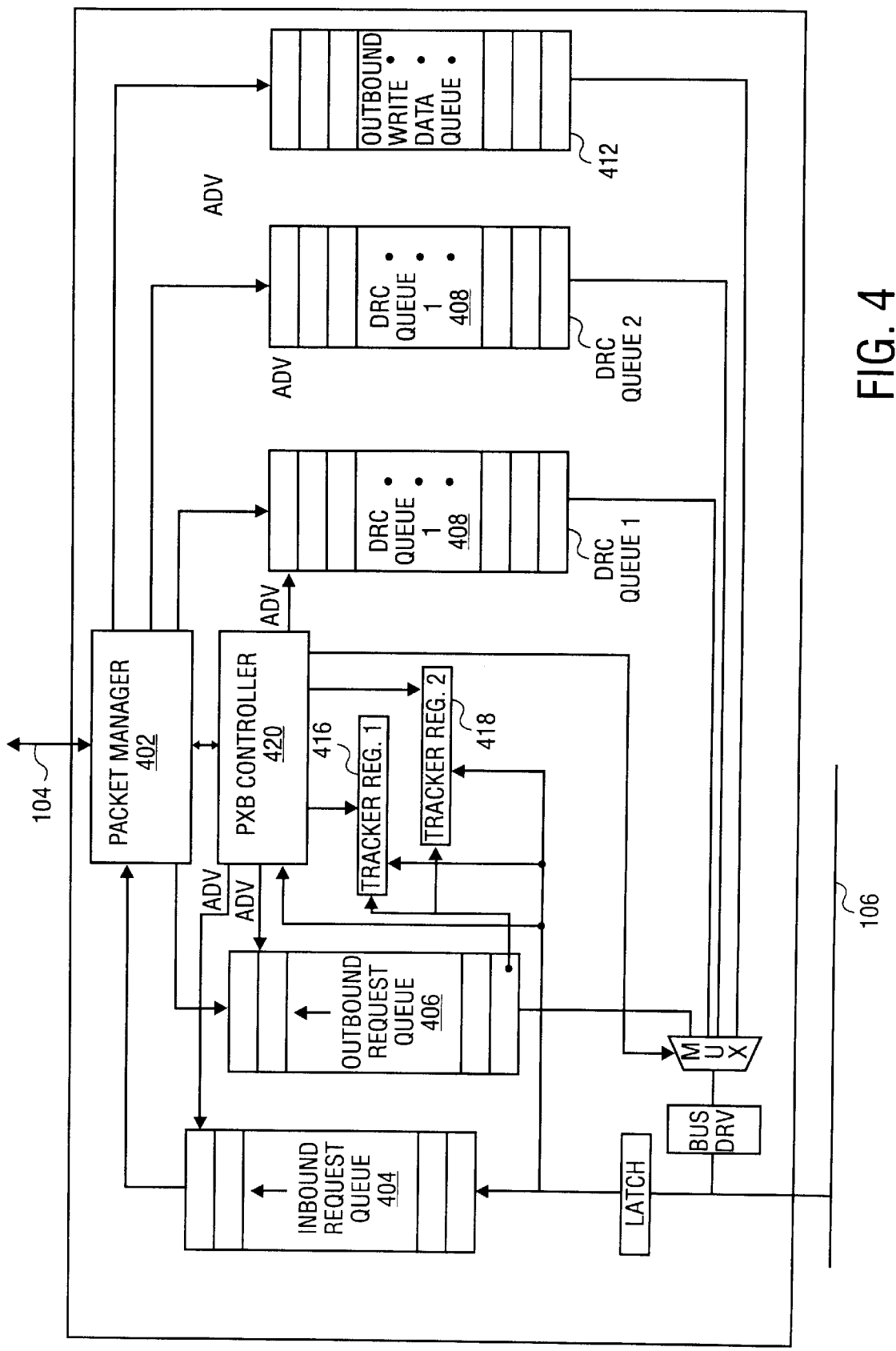
FIG. 4 illustrates the bus bridge of FIG. 1 in further detail in accordance with one embodiment.

FIG. 4 illustrates the relevant parts of bus bridge 110 in accordance with one embodiment. As illustrated, bus bridge 110 includes a number of organized request storage structures 404 and 406 (e.g. queues), a number of organized read data storage structures 408 and 410 (e.g. queues), an organized write data structure 412 (e.g. a queue), a number of tracker registers 416 and 418, and controller 420. Organized request storage structures 404 and 406 (hereinafter, simply queues) are used to store or buffer "inbound" and "outbound" requests. For the purpose of this application, "inbound" refers to the direction towards bus agent 106, whereas "outbound" refers to the direction towards bus agent 108. Requests are first appended to the "end" of the corresponding queues, and then percolated or advanced towards the "head" of the queues under the control of controller 420. Upon reaching the "head" of a queue, the request is "popped off" and processed (in certain cases, if appropriate, e.g. in the case of an "outbound" read complete, when the "appropriate" bus agent logically reconnects to get the data). Organized read data storage structures 408 and 410 (hereinafter, also simply queues) are used to store or buffer "outbound" read data being returned to requesting bus agents. For the illustrated embodiment, one read data queue 408/410 is allocated to buffer the returning data for each read request. Similarly, read data are first appended to the "end" of the allocated queue, and then percolated or advanced towards the "head" of the allocated queue, as the earlier appended data, under the control of controller 420, are being streamed to the logically reconnected requesting bus agent. Organized write data storage structure 412 (hereinafter, also simply queue) is used to store or buffer "outbound" write data destined for an agent on the side of bus 104. Likewise, write data are first appended to the "end" of the write data queue, and then percolated or advanced towards the "head" of the write data queue, under the control of controller 420. Tracker registers 416 and 418 are used to store various control information associated with "inbound" read requests having allocated with queues 408 and 410 respectively.

Figure 5:
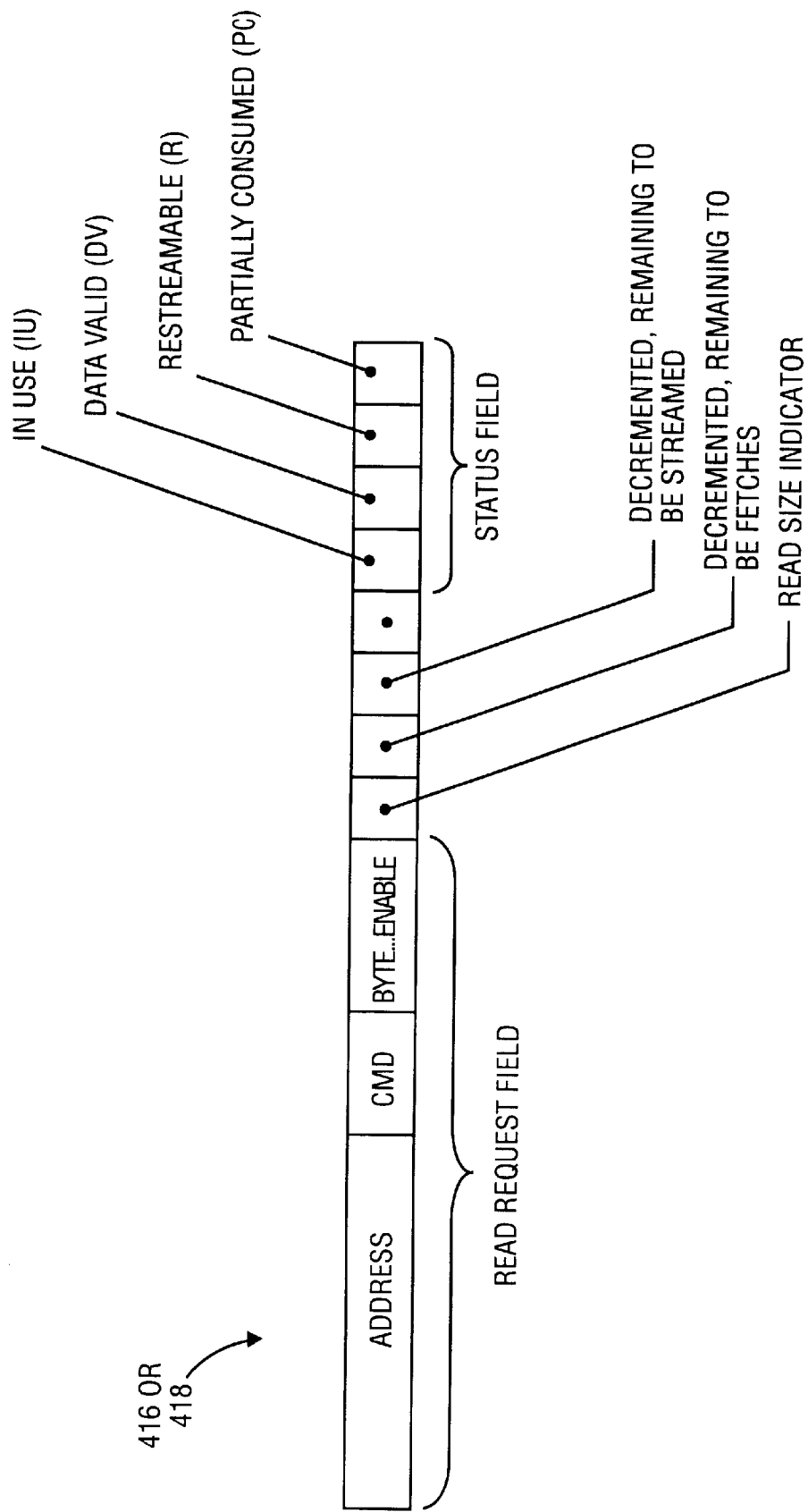
FIG. 5 illustrates a tracker register of FIG. 4 in further detail in accordance with one embodiment.

Skipping briefly to FIG. 5, wherein one embodiment of tracker register 416/418 is shown. As illustrated, each tracker register 416/418 is used to store the control information of a read request, including in particular, the read size indicator, a first decremented copy indicating the amount remaining to be fetched, and a second decremented copy indicating the amount remaining to be streamed, to be described more fully below. Other control information includes the read address, byte enable and so forth, associated with the read request. Additionally, the control information also includes an "in-use" (IU) bit denoting whether the corresponding read data queue is in used or not, a "valid" (V) bit denoting whether the data are valid or not, a "partial complete" (PC) bit denoting whether streaming of the buffered data has started or not, and a "re-stream eligibility" (R) denoting whether the remaining buffered data are eligible for re-streaming if and when the requesting bus agent logically reconnects to resume acceptance of the data being returned.

Referring back to FIG. 4, lastly, controller 420 controls the overall operation of bus bridge 110, including in particular, the controls enumerated above, and managing re-streaming eligibility of any remaining buffered data in queues 408 and 410. Except for the manner in which controller 420 advantageously leverages on the provided read size indicator as noted, the various elements of bus bridge 110 are otherwise intended to represent a broad range of organized storage structures, storage elements, controllers, and so forth, known in the art. Accordingly, they too will not be otherwise further described.

Operationally, upon detection of an "inbound" read request on bus 104, controller 420 first determines if the "inbound" read request is a new request (by checking against the control information associated with previously submitted read requests stored in tracker registers 416–418). If the "inbound" read request is determined to be a new request, controller 420 further determines whether there are sufficient resources to service the request (e.g. space in the "inbound" request queue and availability of read data queues 408–410). If the "inbound" read request is a new request, and there are sufficient resources to service the request, controller 420 causes the read request, including the read size indicator to be latched and appended to the "end" of the "inbound" request queue 404. Additionally, a read data queue 408/410 is allocated to service the request, and the read request is also copied into a tracker register 416/418. If the "inbound" read request is a new request, but there are insufficient resources to service the request, controller 420 rejects the request, asking bus agent 108 to retry later. If the "inbound" read request is not a new request, i.e. a retry (logical reconnect), it will be handled as later described.

The queued "inbound" request situated at the "head" of "inbound" request queue 404 is "popped" off and processed. Concurrently, other remaining ones are advanced correspondingly towards the "head" of the "inbound" request queue 404. If the "popped off" request is a read request, controller 420 causes the read request to be appropriately packaged and sent to the target data source, e.g. bus agent 106, to fetch/pre-fetch certain amount of data, depending on the read command specified. As described earlier, if the "popped off" request is a read request of Memory Read, Memory Read Line, or Memory Read Multiple without read size qualification, controller 420 causes the remaining of the addressed line, plus the next line, or plus n predetermined lines to be pre-fetched, as called for by the aforementioned PCI specification. However, if the "popped off" request is a read request of Memory Read Multiple qualified with the read size, controller 420 causes the smaller of the read size indicated or the size of read data queue 408/410 to be fetched from the target data source (e.g. bus agent 106). Additionally, controller 420 causes the first decremented copy of the read size indicator stored in tracker register 416/418 to be decremented to reflect the remaining amount to be fetched.

Upon detection of an "outbound" request on bus 102, controller 420 determines whether it is an "outbound" read complete or an "outbound" write request. If it is an "outbound" read complete, controller 420 causes the control information to be latched and appended to the "end" of the "outbound" request queue 406, and the read complete data to be appended to the "end" of the allocated read data queue 408/410. If it is an "outbound" write request, controller 420 causes the control information to be latched and appended to the "end" of the "outbound" request queue 406, and the write data to be appended to the "end" of the write data queue 412.

The queued "outbound" request situated at the "head" of "outbound" request queue 406 is examined and conditionally "popped" off and processed. When the "outbound" request at the "head" of "outbound" request queue 406 is "popped off", concurrently, other remaining ones are likewise advanced correspondingly towards the "head" of the "outbound" request queue 406. An "outbound" write request is "popped off" and processed as soon as it reaches the "head" of "outbound" request queue 406. However, unlike the prior art, the processing does not include invalidating any of the pre-fetched read data. The policy of maintaining validity applies to buffered read data where streaming has yet to start, as well as the "remaining ones" where streaming has started, but currently "suspended" (due to agent disconnecting), and marked "re-streaming eligible".

Upon detection of a read complete request at the "head" of "outbound" request queue 406, and reconnection of requesting bus agent 108, controller 420 causes the buffered read data to be streamed to bus agent 108. The streaming continues until queue 408/410 becomes empty or bus agent 108 disconnects.

As read data are streamed off queue 408/410, controller 420 causes the second decremented copy of the read size indicator stored in tracker register 416/418 to be decremented to reflect the remaining amount of read data to be streamed. If the amount of read data remains to be fetched is greater than zero, controller 420 further causes additional read data to be fetched when the amount of buffered data remaining in queue 408/410 falls below a predetermined threshold. Similarly, the amount fetched is the smaller of the amount of read data remains to be fetched and the amount of storage slots available in queue 408/410. Likewise, the first decremented copy of the read size indicator stored in tracker register 416/418 is updated accordingly to reflect the additional fetching. If bus agent 108 disconnects prior to queue 408/410 becoming empty, controller 420 updates the associated tracker register 416/418 to reflect streaming of return data to bus agent 108 has started, and the remaining buffered data are eligible for re-streaming, when bus agent 108 reconnects.

When the requesting bus agent reconnects, it supplies an updated read size indicator, as part of the read transaction. If the targeted address and the updated read size indicator both match the corresponding information stored in one of tracker registers 416/418, and re-streaming is marked as "eligible", controller 420 causes the remaining buffered ones of the read data stored in the corresponding queue 408/410 to be streamed for the reconnecting bus agent.

Thus, under the present invention, there is no wasted pre-fetching, as pre-fetching is performed in accordance with the specified read size, and re-streaming eligibility for remaining pre-fetched data even when write data are passed from bus bridge 110 to agents attached to bus 104. The only time remaining pre-fetched data are lost is when the storing queue is reclaimed for reallocation to another read request. The frequency of such occurrences may be reduced by increasing the number of queue/tracker register pairs.

Figure 6:
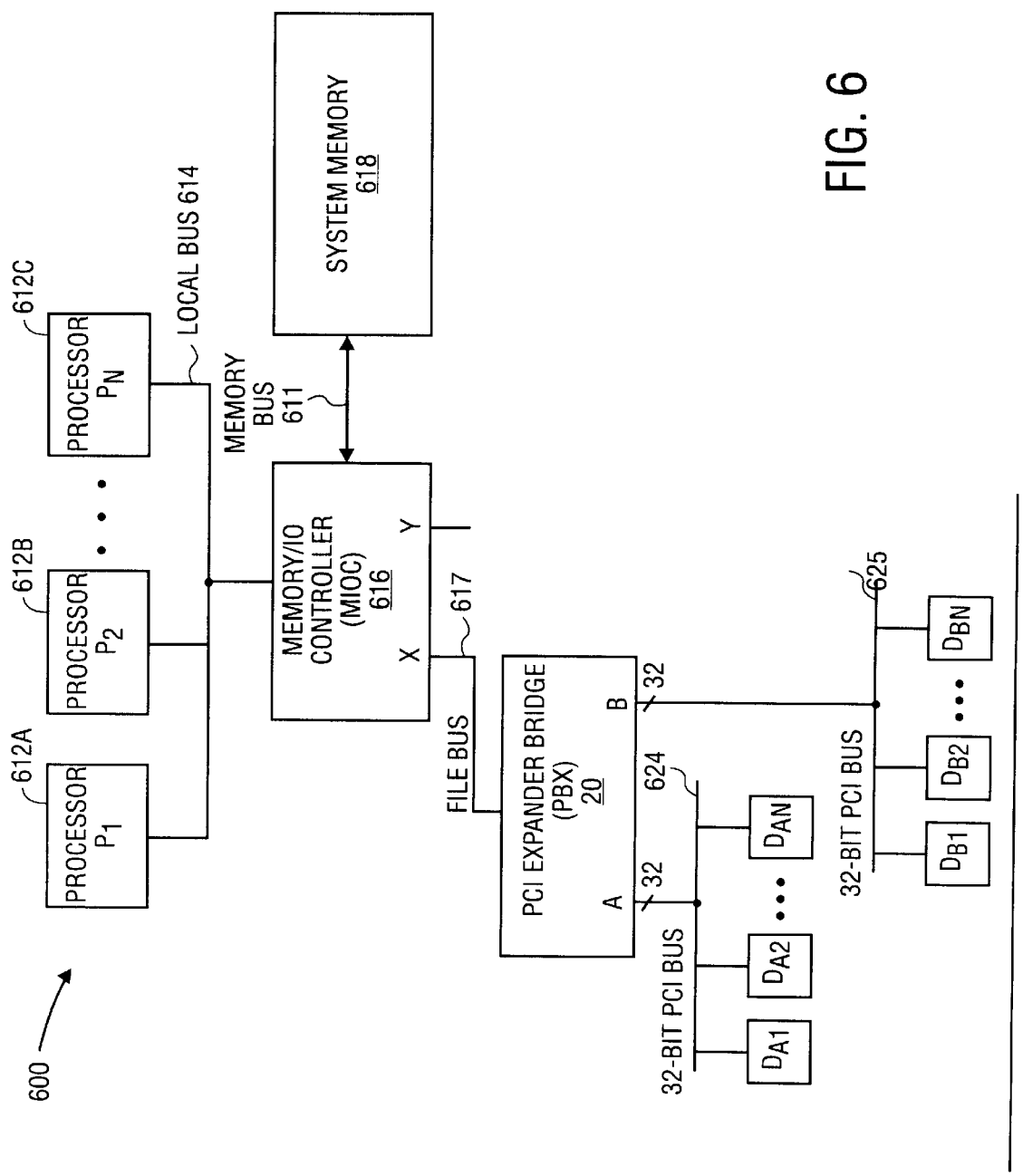
FIG. 6 an example digital system suitable for practicing the present invention.

FIG. 6 illustrates an example digital system suitable for practicing the present invention. As illustrated, digital system 600 includes a number of processor 612a–612c, memory I/O controller (MIOC) 616, system memory 618, bus agents $D_{a1}$–$D_{an}$ and $D_{b1}$–$D_{bn}$. Processors 612a–612c and MIOC 616 are coupled to each other via local bus 614, where MIOC 616 and system memory are coupled to each other via memory bus 611. Bus agents $D_{a1}$–$D_{an}$ as well as $D_{b1}$–$D_{bn}$. and MIOC 616 are coupled to each other via PCI bus 624 and 625, and F16 bus 617 bridged by PCI expander bridge 620.

At least one bus agents $D_{a1}$–$D_{an}$ or $D_{b1}$–$D_{bn}$. and PCI expander bridge 620 are incorporated with the teachings of the present invention described in reference to bus agent 108 and bus bridge 110. Except for these teachings, all enumerated elements are otherwise known in the art, and they perform their conventional functions.

Conclusion

From the foregoing description, those skilled in the art will recognize that many other variations of the present invention are possible. Thus, the present invention is not limited by the details described; instead, the present invention can be practiced with modifications and alterations within the spirit and scope of the appended claims. Accordingly, a novel bus bridging method and apparatus, including the use of a read size indicator to facilitate retrieval of data by a bus agent from a bridged data source has been described.

What is claimed is:

1. A bus bridging method comprising:
a bus agent providing to a bus bridge a read data request targeting a data source bridged by the bus bridge, and including with said read request a read address indicating a starting storage location of the requested data, and a read size indicator indicating the size of the requested data; and
the bus bridge, in response, facilitating provision of the requested data to the bus agent, including streaming buffered ones of the requested data to the bus agent through one or more successive streaming connections to the bus bridge by the bus agent, with the bus bridge factoring the included read size indicator into consideration in managing re-streaming eligibility of remaining buffered ones of the requested data.

2. The method of claim 1, wherein said providing of the read data request by the bus agent comprises providing the read data request through a bus transaction having at least one phase, including providing the read address in a first of the at least one phase and the read size indicator in the same phase.

3. The method of claim 1, wherein said providing of the read data request by the bus agent comprises providing the read data request through a bus transaction having a plurality of phases, including providing the read address in a first phase and the read size indicator in a second subsequent phase.

4. The method of claim 1, wherein said providing of the read data request by the bus agent comprises re-providing by the bus agent an updated version of the read size indicator to the bus bridge, when the bus agent re-establishes a streaming connection to the bus bridge to continue streaming remaining buffered ones of the requested data to the bus agent.

5. The method of claim 1, wherein said facilitating provision of the requested data by the bus bridge, includes the bus bridge keeping track of the amount of requested data remain to be streamed to the bus agent.

6. The method of claim 5, wherein said facilitating provision of the requested data by the bus bridge further comprises the bus bridge restreaming remaining buffered ones of the requested data to the bus agent, only if the amount of requested data remain to be streamed to the bus agent as tracked by the bus bridge matches an updated version of the read size indicator re-provided by the bus agent.

7. The method of claim 1, wherein said facilitating provision of the requested data by the bus bridge comprises the bus bridge maintaining re-streaming eligibility of remaining buffered ones of the requested data, notwithstanding posting of a write transaction in a direction towards the bus agent while the bus agent is disconnected from the bus bridge in between streaming connections.

8. The method of claim 1, wherein said facilitating provision of the requested data by the bus bridge comprises the bus bridge pre-fetching additional ones of the requested data from the data source, when remaining buffered ones of the requested data fall below a predetermined threshold and not all of the requested data had been previously fetched.

9. A bus bridging apparatus comprising:
a first organized storage structure to buffer data to be streamed to a first bus agent, in response to a first read data request received from the first bus agent, the first read data request targeting a first data source bridged by the bus bridging apparatus and having at least a first read address denoting a first starting location of the first requested data and a first read size indicator indicating the size of the first requested data; and
control circuitry coupled to first organized storage structure to control retrieval of the first requested data from the first data source through one or more fetches, buffering the retrieved ones of the first requested data in the first organized storage structure, and streaming the buffered ones of the first requested data to the bus agent through one or more streaming connections, including managing re-streaming eligibility of remaining buffered ones of the first requested data based at least in part on said included first read data size indicator.

10. The bus bridging apparatus of claim 9, wherein said control circuitry includes logic to control receipt of the first read data request from the first bus agent through a first bus transaction having at least one phase, including receipt of the first read address in a first of the at least one phase and the first read size indicator in the same phase.

11. The bus bridging apparatus of claim 9, wherein said control circuitry includes logic to control receipt of the first read data request from the first bus agent through a first bus transaction having a first plurality of phases, including providing the first read address in a first phase and the first read size indicator in a second subsequent phase.

12. The bus bridging apparatus of claim 9, wherein said control circuitry includes logic to control receipt of an updated version of the first read size indicator from the first bus agent, when the first bus agent re-establishes a streaming connection to the bus bridge apparatus to continue streaming remaining buffered ones of the first requested data to the first bus agent.

13. The bus bridging apparatus of claim 9, wherein said control circuitry includes logic to keep track of the amount of the first requested data remain to be streamed to the first bus agent.

14. The bus bridging apparatus of claim 13, wherein said control circuitry includes logic to control the first organized structure to stream remaining buffered ones of the first requested data to the first bus agent, only if the amount of the first requested data remain to be streamed to the first bus agent as tracked by the bus bridge apparatus matches an updated version of the first read size indicator re-provided by the first bus agent.

15. The bus bridging apparatus of claim 9, wherein said control circuitry includes logic to maintain re-streaming eligibility of remaining buffered ones of the first requested data, notwithstanding posting of a write transaction in a direction towards the first bus agent while the first bus agent is disconnected from the bus bridge apparatus in between streaming connections.

16. The bus bridging apparatus of claim 9, wherein said control circuitry includes logic to pre-fetch additional ones of the first requested data from the first data source, when remaining buffered ones of the first requested data fall below a first predetermined threshold and not all of the first requested data had been previously fetched.

17. The bus bridging apparatus of claim 9, wherein
said bus bridging apparatus further comprises a second organized storage structure to buffer data to be streamed to a second bus agent, in response to a second read data request received from the second bus agent, the second read data request targeting a second data source bridged by the bus bridging apparatus and having at least a second read address denoting a second starting location of the second requested data and a second read size indicator indicating the size of the second requested data; and
the control circuitry is further coupled to the second organized storage structure to control the second organized storage structure in a like manner as the control circuitry controls the first organized storage structure.

18. The bus bridging apparatus of claim 9, wherein said bus bridging apparatus is a PCI bus bridge, and the first bus agent is a first PCI bus agent.

19. A bus agent comprising:
an interface to couple the bus agent to a bus; and
control circuitry coupled to the interface to provide a read data request to a bus bridge coupled to the bus, with the read data request targeting a data source bridged by the bus bridge, and including a read address denoting a starting storage location of the requested data, and a read size indicator denoting the size of the requested data, with the read size indicator being also used by the bus bridge to manage re-streaming eligibility of remaining buffered ones of the requested data, which are being streamed to the bus agent through a plurality of successive streaming connections to the bus bridge.

20. The bus agent of claim 19, wherein said control circuitry includes logic to control provision of the read data request through a bus transaction having at least one phase, including controlling provision of the read address in a first of the at least one phase and the read size indicator in the same phase.

21. The bus agent of claim 19, wherein said control circuitry includes logic to control provision of the read data request through a bus transaction having a plurality of phases, including controlling provision of the read address in a first phase and the read size indicator in a second subsequent phase.

22. The bus agent of claim 19, wherein said control circuitry includes logic to control re-provision by the bus agent an updated version of the read size indicator to the bus bridge, when the bus agent re-establishes a streaming connection to the bus bridge to continue streaming remaining buffered ones of the requested data to the bus agent.

23. The bus agent of claim 19, wherein said bus agent is a PCI bus agent, and the bus bridge is a PCI bus bridge.

* * * * *

UNITED STATES PATENT AND TRADEMARK OFFICE
CERTIFICATE OF CORRECTION

PATENT NO.   : 6,502,154 B1                                                 Page 1 of 1
DATED        : December 31, 2002
INVENTOR(S)  : Meredith et al.

It is certified that error appears in the above-identified patent and that said Letters Patent is hereby corrected as shown below:

<u>Title page,</u>
Item [75], delete "Wendell S. Wenjen" and insert -- Wendell C. Wenjen --.

Signed and Sealed this

Twenty-seventh Day of May, 2003

JAMES E. ROGAN
*Director of the United States Patent and Trademark Office*